(12) United States Patent
Lin et al.

(10) Patent No.: US 8,050,678 B2
(45) Date of Patent: Nov. 1, 2011

(54) APPARATUS AND METHOD FOR EXECUTING THE HANDOFF PROCESS IN WIRELESS NETWORKS

(75) Inventors: Yi-Bing Lin, Hsinchu (TW); Shih-Feng Hsu, Tainan (TW)

(73) Assignees: Industrial Technology Research Institute, Hsinchu (TW); National Chiao Tung University, Hsinchu (TW)

( * ) Notice: Subject to any disclaimer, the term of this patent is extended or adjusted under 35 U.S.C. 154(b) by 782 days.

(21) Appl. No.: 12/114,818

(22) Filed: May 5, 2008

(65) Prior Publication Data

US 2009/0170476 A1      Jul. 2, 2009

(30) Foreign Application Priority Data

Dec. 26, 2007   (TW) ................................ 96150292 A (51) Int. Cl.
*H04W 36/00* (2009.01)
(52) U.S. Cl. .................. 455/436; 455/411; 370/331
(58) Field of Classification Search .................. None
See application file for complete search history.

(56) References Cited

U.S. PATENT DOCUMENTS

| | | | |
|---|---|---|---|
| 7,120,136 B2 | 10/2006 | Upp et al. .............. | 370/331 |
| 7,120,460 B2 | 10/2006 | Shaheen et al. ........ | 455/552.1 |
| 7,133,669 B2 | 11/2006 | Nair et al. .............. | 455/432.1 |
| 2006/0148479 A1 | 7/2006 | Park et al. | |
| 2006/0256763 A1 | 11/2006 | Nguyen et al. ........ | 370/338 |
| 2008/0065888 A1* | 3/2008 | Zheng et al. ........... | 713/171 |
| 2008/0072047 A1* | 3/2008 | Sarikaya et al. ........ | 713/171 |
| 2010/0266130 A1* | 10/2010 | Lin et al. ............... | 380/279 |

FOREIGN PATENT DOCUMENTS

| | | |
|---|---|---|
| KR | 20070061237 | 6/2007 |
| TW | I263439 | 10/2006 |

OTHER PUBLICATIONS http://en.wikipedia.org/wiki/ IEEE_802.11r, Fast BSS Transitions, Apr. 17, 2008.

* cited by examiner

*Primary Examiner* — Erika Gary (57) ABSTRACT

Disclosed is an apparatus and method for executing the handoff process in the wireless networks. The apparatus comprises a processor to execute an identity checking mechanism. When a wireless network station wants to move from a source AP to a destination AP, the wireless network station sends an authentication request message to the destination AP. The identity checking mechanism searches a R0KH table of the destination AP for the R0KH ID contained in the authentication request message, and determines a setting parameter for executing a handoff process. Thereby, the wireless network station may execute the handoff process. A R0KH table of an AP consists of all IDs of R0KHs that can be accessed by the AP.

13 Claims, 7 Drawing Sheets

APPARATUS AND METHOD FOR EXECUTING THE HANDOFF PROCESS IN WIRELESS NETWORKS

CROSS-REFERENCE TO RELATED APPLICATIONS

This application claims priority benefit under 35 U.S.C. §119 to Taiwan Patent Application Number 096150292, filed on Dec. 26, 2007.

FIELD OF THE INVENTION

The present invention generally relates to an apparatus and method for executing the handoff process in the wireless networks.

BACKGROUND OF THE INVENTION

The wireless networks are an important medium for connecting to Internet. The wireless network is more prone to tapping and theft in comparison with the wired network. Between an access point (AP) and a wireless network station, the use of a security key for authentication and encryption is an important issue for wireless networks. If the AP and the wireless network station do not save the security key in advance, the key will cause the execution of a handoff process when the wireless network station is connected to an AP.

Because the handoff process takes much time, the execution of the handoff process may interrupt the real-time application, such as voice over IP (VoIP). IEEE802.11r protocol defines a three-level key architecture to accelerate the execution of the handoff process and generate a security key.

Figure 1:
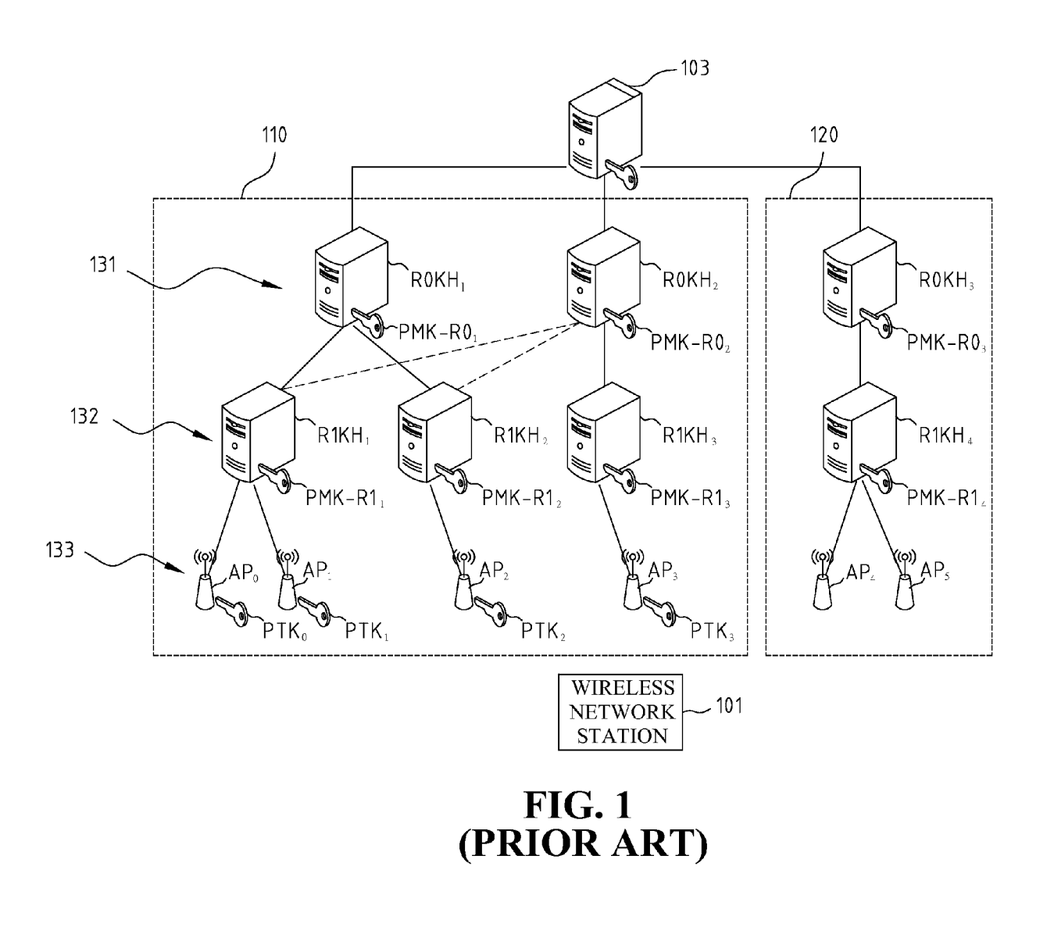
FIG. 1 shows a schematic view of an exemplary 3-level key architecture of IEEE802.11r communication protocol.

FIG. 1 shows a schematic view of an exemplary three-level key architecture of IEEE802.11r protocol. Referring to FIG. 1, the first level key is Pairwise Master Key R0, or PMK-R0. PMK-R0 is generated by the first level Master Session Key (MSK) or Authentication, Authorization and Accounting (AAA)-key, and is saved at a wireless network station 101 and a R0 key holder (R0KH). MSK is generated and separately by wireless network station 101 executing the handoff process and by AAA server 103 executing IEEE802.1X authentication. R0KH plays the role of an AAA client to receive and store the MSK from AAA server 103.

The second level key PMK-R1 is stored at wireless network station 101 and a R1 key holder (R1KH). PMK-R1 is generated by PMK-R0. PMK-R1 may be used to generate the third level Pairwise Transient Key (PTK). The PTK is the key for message encryption and decryption between wireless network station 101 and the APs inside the third level.

The aforementioned IEEE802.11r three-level key architecture defines the mobility domain (MD) architecture. As shown in FIG. 1, an MD includes a plurality of R0KHs at first level 131. Each R0KH has connections to a plurality of R0KHs, for R1 from all the R0KHs in the MD, for example, $R1KH_1$ and $R1KH_2$ may obtain PMK-R1 directly from $R0KH_1$, or indirectly from $R0KH_2$. Second level 132 is all the R1KHs. Third level 133 is all the APs of an MD in the following description.

Based on the MD architecture defined in IEEE802.11r protocol specifications, the movement of the wireless network station may be divided into intra-MD movement and Inter-MD movement. The intra-MD movement may be further divided into intra-R1KH movement and inter-R1KH movement. For example, wireless network station 101 switching from $AP_0$ to $AP_1$ is an intra-R1KH movement, and switching from $AP_1$ to $AP_2$ or $AP_3$ is an inter-R1KH movement. These two examples are both intra-MD movements within domain 110. On the other hand, a switching from $AP_3$ in MD 110 to $AP_4$ in MD 120 is an inter-MD movement.

When moving in MD, a wireless network station needs to execute a fast basic service set (Fast BSS) handoff process. For the inter-MD movement, the wireless network station needs to execute an initial MD association handoff process. Through the MD Identity (MDID) embedded in the periodical broadcast of probe and beacon messages by the AP, it is possible to distinguish the inter-MD movement from the intra-MD movement.

The current MDID can be assigned by each vendor; however, there is no guarantee that the MDID assigned by different vendors will be unique. Therefore, when a wireless network station executes an inter-MD movement, the inter-MD movement may be mistakenly identified as an intra-MD movement because of the same MDID, and then the Fast BSS handoff process is executed. In this scenario, during the execution of the Fast BSS handoff process, the AP cannot generate the PTK because the R1KH cannot obtain PMK-R1 from R0KH used by the wireless network station. Therefore, the AP will notify the wireless network station to terminate the Fast BSS handoff process, and to execute the initial MD association handoff process.

Figure 2:
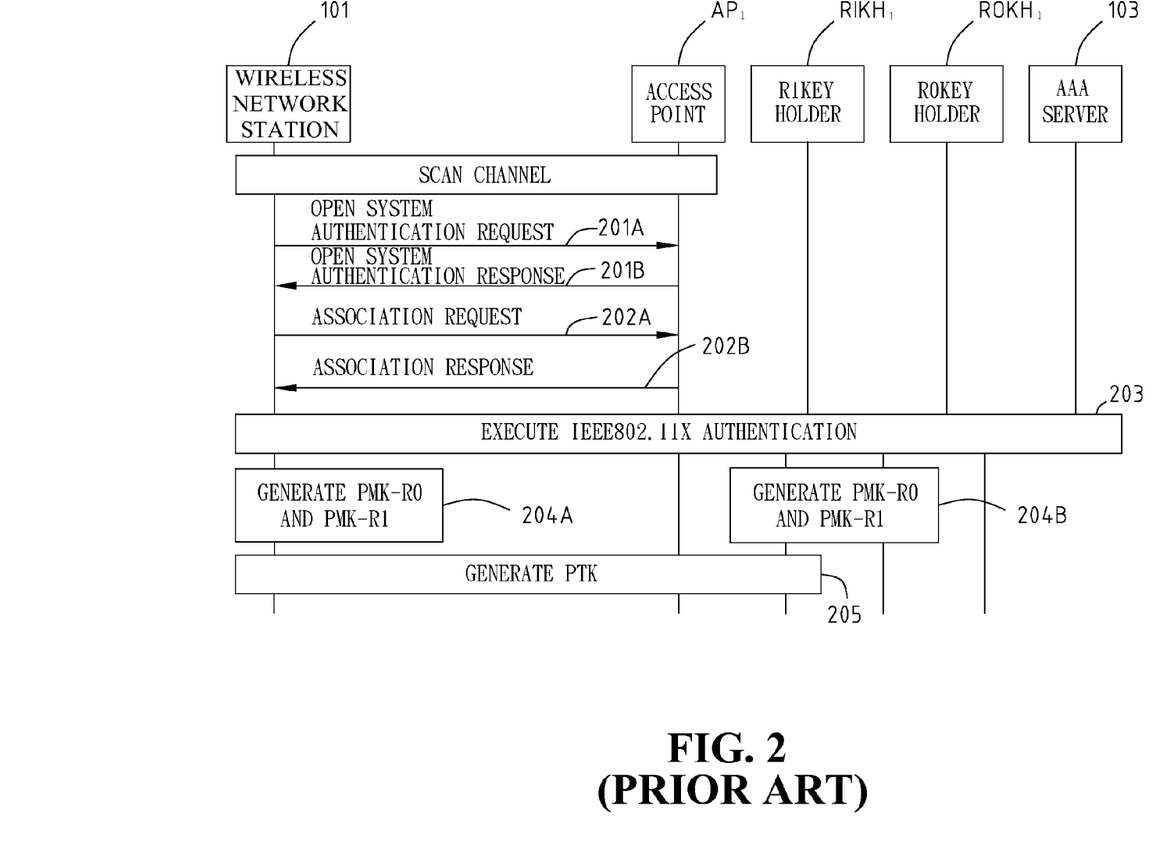
FIG. 2 shows a schematic view of an exemplary flowchart of a wireless network station executing an initial MD association handoff process.
Figure 3:
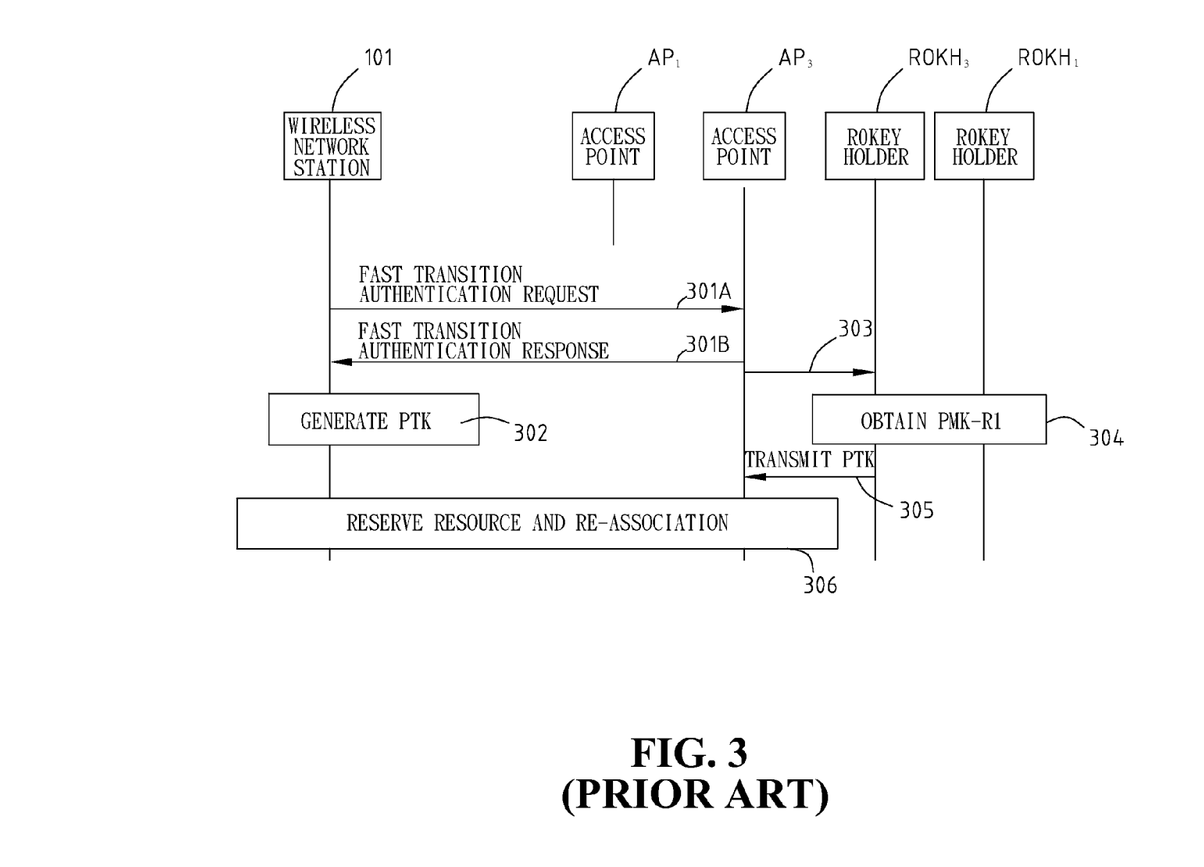
FIG. 3 shows a schematic view of an exemplary flowchart of a wireless network station executing a Fast BSS handoff process.

FIG. 2 and FIG. 3 show the exemplary flowcharts of the initial MD association handoff process and the Fast BSS handoff process, respectively.

In FIG. 1, when wireless network station 101 turns on the wireless network function, wireless network station 101 can connect to the wireless network through $AP_1$ of MD 110, or move from MD 120 to the coverage range of $AP_1$, which can be known from the probe and beacon messages broadcast by $AP_1$ to be an inter-MD movement. Wireless network station 101 executes the initial MD association handoff process in FIG. 2.

In step 201A and step 201B, wireless network station 101 and $AP_1$ execute the open system authentication process. In step 201A, wireless network station 101 transmits an authentication request to $AP_1$. In step 201B, $AP_1$ replies the authentication response to wireless network station 101. After the open system authentication process finishes, $AP_1$ allows wireless network station 101 to transmit IEEE802.11r communication protocol messages to AAA server.

Steps 202A & 202B are association request and association response, respectively. In step 202A, wireless network station 101 transmits an association request to $AP_1$, where the field of the mobility domain information element (MDIE) of the association request message is set as "0" to indicate that wireless network station 101 supports the Fast BSS handoff process. In step 202B, $AP_1$ uses the association response message to store the $R0KH_1$, $R1KH_1$ and MDID in the MDIE field, and transmits the association response message to wireless network station 101.

In step 203, wireless network station 101 executes the IEEE803.1X authentication to AAA server 103 through $AP_1$. After the authentication step is successful, wireless network station 101 and AAA server 103 generate the MSK respectively, and AAA server 103 will transmit the MSK to $R0KH_1$.

Steps 204A & 204B are to generate PMK-R0 and PMK-R1, respectively. In step 204A, wireless network station 101 and $R0KH_1$ execute the key derivation function (KDF) algorithm, respectively, to use $R0KH_1$ with MSK, and the MAC address of wireless network station 101 to generate PMK-R0. In step 204B, PMK-R1 may be generated by using PMK-R0, the MAC address of wireless network station 101, and the ID of $R1KH_1$.

In step 205, wireless network station 101 and $AP_1$ execute the 4-way handshake of IEEE802.11i to generate the PTK. In this step, wireless network station 101 and $AP_1$ generate a random number "SNonce" and a random number "ANonce", respectively, and exchange. $AP_1$ transmits the two random numbers "SNonce" and "ANonce", the ID of $R0KH_1$, the MAC address of wireless network station 101 and the MAC address of $AP_1$ to $R1KH_1$. Then, wireless network station 101 and $R1KH_1$ execute the KDF algorithm, respectively, and use the above parameters, the ID of $R1KH_1$ and PMK-R1 to generate the PTK. After generating the PTK, $R1KH_1$ transmits the PTK to $AP_1$.

After executing the above initial MD association handoff process, wireless network station 101 is successfully connected to $AP_1$, and $R0KH_1$ and $R1KH_1$ will store PMK-R0 and PMK-R1, respectively. PMK-R0 and PMK-R1 may be used to generate a new PTK. Therefore, the time-consuming IEEE802.1X authentication process may be saved to reduce the handoff process time.

When the wireless network station moves within $MD_1$, for example, from $AP_1$ to $AP_3$, the wireless network station may execute the Fast BSS handoff process of FIG. 3.

Because $AP_1$ and $AP_3$ are both in $MD_1$, in step 301A, wireless network station 101 notifies $AP_3$ through the fast transition (FT) authentication request message to execute FT authentication. The authentication request message includes a random number SNonce for generating the PTK, and an MDIE field. The MDIE field includes the IDs of $R0KH_1$, $R1KH_1$, and MDID of $MD_1$.

$AP_3$ knows of the occurrence of the inter-R1KH switch from the authentication request message, and replies an authentication response message to wireless network station 101, as shown in step 301B. The authentication response message includes a random number ANonce for generating the PTK, and an MDIE field. The MDIE field at least includes the IDs of $R0KH_2$, $R1KH_3$, and MDID of MD 110.

After receiving the FT authentication response message from $AP_3$, wireless network station 101 uses random numbers ANonce and MDIE, and with ID of $R1KH_3$, the MAC address of wireless network station 101 and PMK-R0 to generate PMK-R1. The PMK-R1 will be stored in wireless network station 101 and $R1KH_3$. Then, step 302 is to generate the PTK according to the MAC address of wireless network station 101, the MAC address of $AP_3$, SNonce, ANonce, and the IDs of $R0KH_1$ and $R1KH_3$. If wireless network station 101 moves from $AP_1$ to $AP_0$, the old PMK-R1 may be used directly to generate the PTK because $AP_1$ and $AP_0$ are connected to the same R1KH.

As shown in step 303, $AP_3$ transmits the MAC address of wireless network station 101, the MAC address of AP, SNonce, ANonce, and the ID of $R0KH_1$ to $R1KH_3$ for generating a new PTK.

In step 304, according to the ID of $R0KH_1$, $R1KH_3$ requests PMK-R1 from $R0KH_1$. However, if wireless network station 101 moves from $AP_1$ to $AP_0$, this step may be omitted.

After obtaining a new PMK-R1, $R1KH_3$ executes a KDF algorithm to generate the PTK and transmits the PTK to $AP_3$, as shown in step 305. After step 305, wireless network station 101 and $AP_3$ both have the same PTK.

Wireless network station 101 and $AP_3$ then execute step 306 for resource from $AP_1$ to $AP_3$. In this manner, wireless network station 101 may start to use $AP_3$ service.

In the Fast BSS handoff process, the PMK-R0 is re-used to generate the new PTK to accelerate the handoff process. Because the AP will broadcast the probe and beacon response frame with the IDs of R0KH and R1KH used by the AP and the ID of MD embedded in the frame, the appropriate handoff process may be selected after the wireless network station selects the AP, and whether the movement is an Inter-MD movement or an intra-MD movement is determined. Especially, the MAC address may be used to identify R0KH and R1KH, and MDID is managed by the vendors.

SUMMARY OF THE INVENTION

In accordance with the exemplary embodiments of the present invention, the disclosed is directed to an apparatus and method for executing the handoff process in wireless networks. Without using MDID for executing the handoff process, the uncertainty of MDID may be ruled out. In the present disclosure, each AP stores a R0KH table, and the R0KH table records the IDs of all the R0KHs at the AP.

In an exemplary embodiment of the present invention, the disclosed is directed to an apparatus for executing the handoff process in wireless network. The apparatus comprises a processor to execute an identity checking mechanism. The R0KH table of a destination AP consists of the IDs of all the R0KHs accessible within the coverage of the destination AP. When a wireless network station wants to move from a source AP to a destination AP, the wireless network station sends an authentication request message to the destination AP. The identity checking mechanism searches the R0KH table of the destination AP for the R0KH ID contained in the authentication request message, and determines a setting parameter for executing a handoff process. Thereby, the wireless network station may execute the handoff process.

In another exemplary embodiment of the present invention, the disclosed is directed to a method for executing the handoff process in wireless networks, applicable to the movement of a wireless network station. When a wireless network station wants to move from a source AP to a destination AP, the method comprises: a wireless network station transmitting an authentication request message to the destination AP, the authentication request message including an R0KH ID; using the R0KH ID to search the R0KH table of the destination AP for selecting a transition process, the R0KH table of the destination AP including the IDs of all the R0KHs accessible to the destination AP; when the R0KH ID is not in the R0KH table, executing an initial MD association handoff process; and when the R0KH ID in the R0KH table, executing a Fast BSS handoff process.

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

The disclosed embodiments in accordance with the present invention may provide an apparatus and a method for the AP to select the suitable handoff process for the wireless network station without using the MDID to avoid the MDID collision. In the disclosed embodiments, each AP stores a R0KH table with all the R0KH IDs. When the wireless network station moves from an AP to another AP, the present invention may help the wireless network station select a suitable handoff process by searching the R0KH table. The movement of the wireless network station may be either an inter-MD movement or an intra-MD movement.

Figure 4:
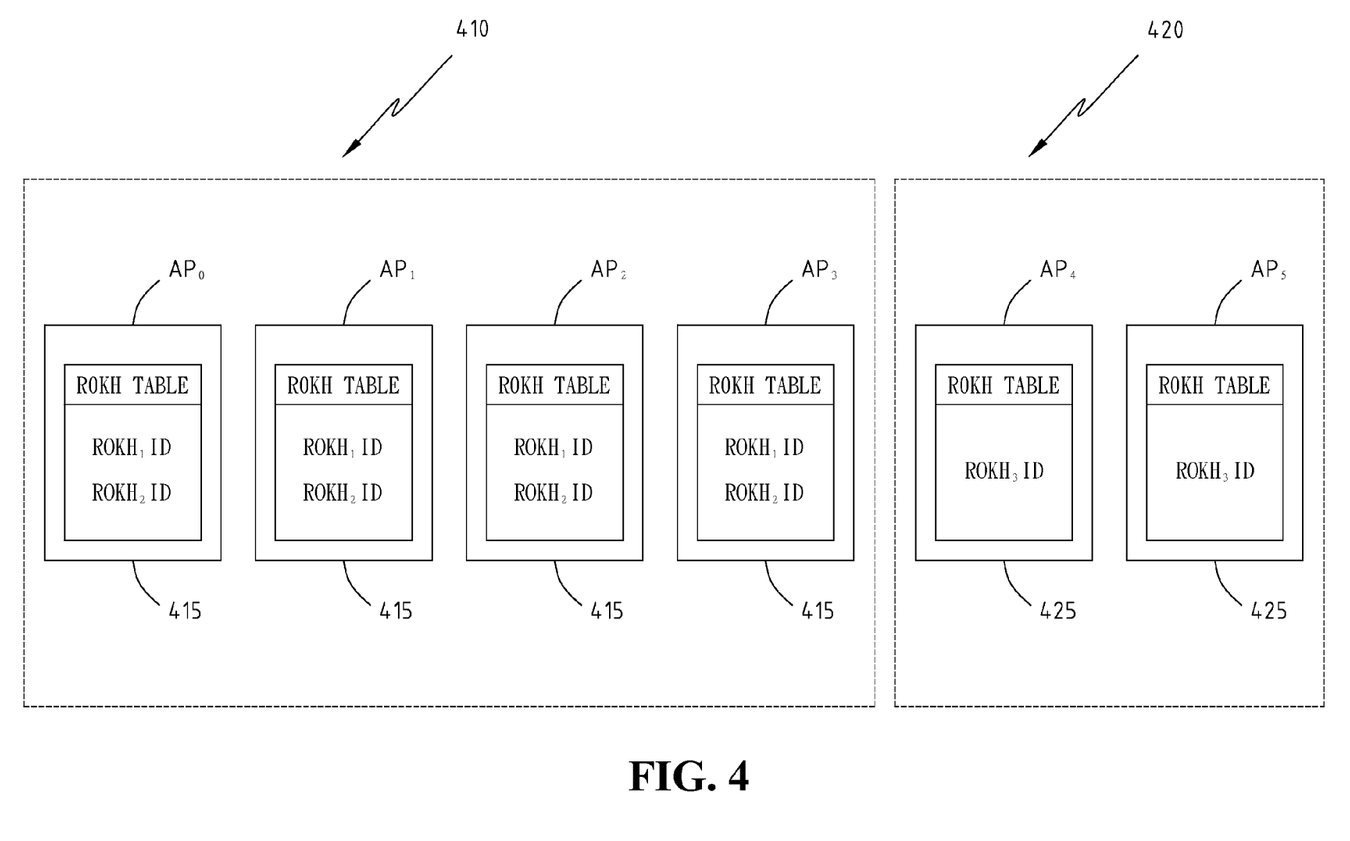
FIG. 4 shows a schematic view of an exemplary R0KH table, consistent with certain disclosed embodiments of the present invention.

Take the 3-level key architecture of IEEE802.11r communication protocol in FIG. 1 as an example. The R0KH table of the present invention may be described as in FIG. 4. Because in the architecture of FIG. 1, the R0KH ID holders of MD 110 are $R0KH_1$ and $R0KH_2$ of first level 131, therefore, each AP of MD 410 of FIG. 4, i.e., $AP_0$, $AP_1$, $AP_2$, $AP_3$, stores a R0KH table 415 consisting of $R0KH_1$ ID and $R0KH_2$ ID. Similarly, in the architecture of FIG. 1, the R0KH ID holder of MD 120 is $R0KH_3$, therefore, each AP of MD 420 of FIG. 4, i.e., $AP_4$, $AP_5$, stores a R0KH table 425 consisting of $R0KH_3$ ID.

Figure 5:
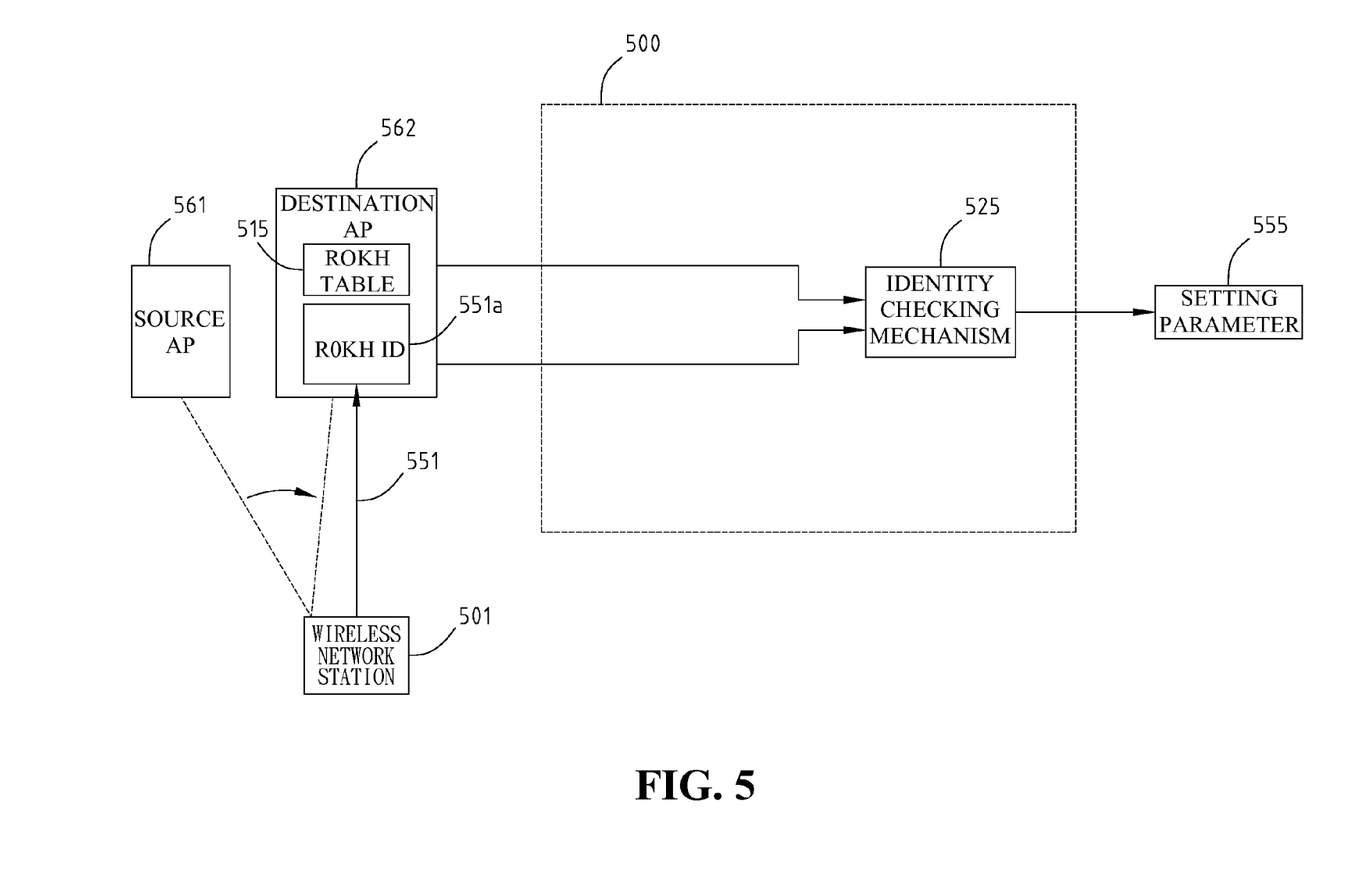
FIG. 5 shows a schematic view of an exemplary apparatus for executing the handoff process in a wireless network, consistent with certain disclosed embodiments of the present invention.

With the R0KH table, each AP may select the suitable handoff process for the wireless network station without MDID. FIG. 5 shows a schematic view of an exemplary apparatus for executing the handoff process in a wireless network, consistent with certain disclosed embodiments of the present invention.

Referring to FIG. 5, an apparatus 500 comprises a processor (not shown) for executing an identity checking mechanism 525. When a wireless network station 501 wants to move from a source AP 561 to a destination AP 562, wireless network station 501 transmits an authentication request message 551 to destination AP 562. Identity checking mechanism 525 uses a R0KH ID 551a in authentication request message 551 to search for R0KH table 515 and determines a setting parameter 555 of a handoff process. R0KH table 515 may include the IDs of all the R0KHs in the coverage range accessible to the destination AP.

Figure 6:
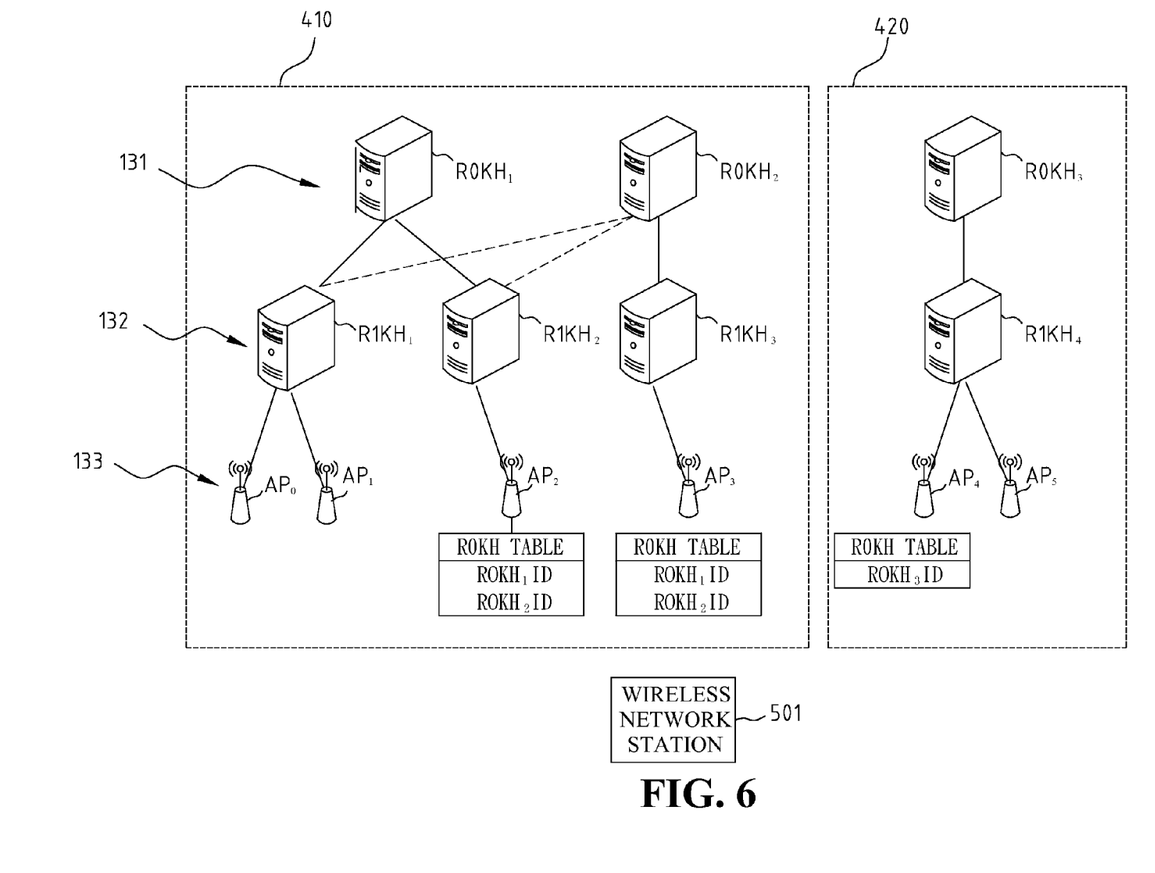
FIG. 6 shows an exemplary schematic view of the R0KH tables stored at the source AP and the destination AP for a wireless network station to execute an inter-MD or an Intra-MD movement, consistent with certain disclosed embodiments of the present invention.

For example, in FIG. 6, when wireless network station 501 wants to move from $AP_2$ to $AP_3$, identity checking mechanism 525 checks and finds that $R0KH_2$ ID is in the R0KH table at $AP_3$, it determines that the FT authentication is a setting parameter for the handoff process. On the other hand, when wireless network station 501 wants to move from $AP_2$ to $AP_4$, identity checking mechanism 525 checks and finds that $R0KH_2$ ID is not in the R0KH table at $AP_4$, it determines that the open system authentication is a setting parameter for the handoff process.

After receiving the authentication response message from the destination AP, wireless network station 501 will execute the Fast BSS handoff process if the setting parameter in the response message is FT authentication; on the other hand, wireless network station 501 will execute the initial MD association handoff process if the setting parameter is the open system authentication.

Therefore, in FIG. 6, when wireless network station 501 makes an intra-MD movement, such as, from $AP_2$ to $AP_3$, the setting parameter in the response message is FT authentication. Hence, wireless network station 501 will execute the Fast BSS handoff process. If wireless network station 501 makes an inter-MD movement, such as, from $AP_2$ to $AP_4$, the setting parameter in the response message is the open system authentication. Hence, wireless network station 501 will execute the initial MD association handoff process. So, regardless whether the movement is an inter-MD or an Intra-MD movement, the wireless network station may always execute the suitable handoff process.

Because the change and update of the R0KHs within the MD coverage is less frequent, the contents of R0KH table 515 may be either dynamically or statically set in the AP through the AP management system. The storing of the IDs of all the R0KHs may be done through the search of R0KH table 515, and the AP management system allows the wireless network station to select the handoff process. The exemplary structure of the disclosed embodiments in accordance with the present invention does not need to manage MDID. Therefore, the execution of an unsuitable handoff process caused by the MDID collision will not occur. The present invention is also applicable to the wireless network platforms of IEEE802.11r communication protocol.

According to the exemplary architecture of the disclosed embodiments, when the change or update of the R0KHs of a MD occurs, the IDs of the R0KHs in the AP may be dynamically or manually updated.

Figure 7:
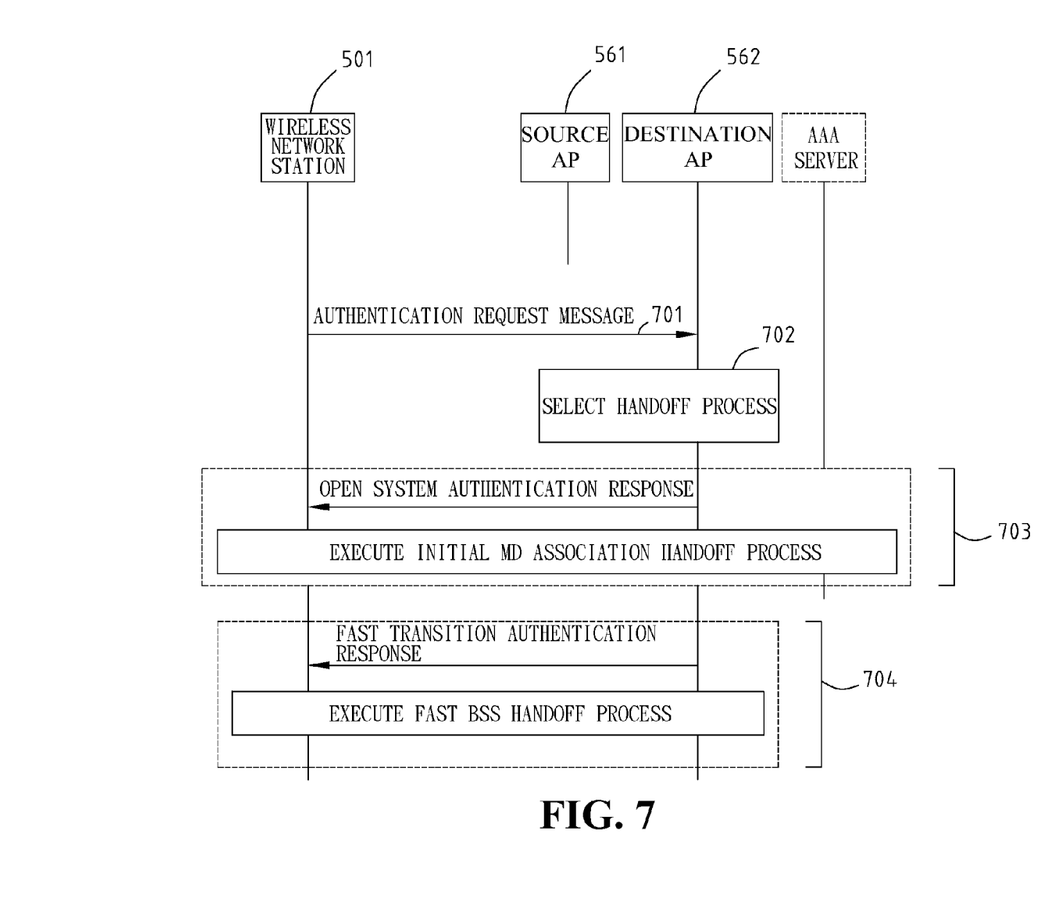
FIG. 7 shows a schematic view of an exemplary flowchart of the method for executing handoff process in wireless networks, consistent with certain disclosed embodiments of the present invention.

FIG. 7 further shows a schematic view of an exemplary flowchart of the method for executing the handoff process in wireless networks, consistent with certain disclosed embodiments of the present invention. Referring to FIG. 7, after wireless network station 501 successfully executes data communication and connection with source AP 561, and when wireless network station 501 wants to move from source AP 561 to destination AP 562, destination AP 562 has an R0KH table. The R0KH table stores the IDs of all the R0KHs accessible to destination AP 562 within the MD coverage. The following steps 701-704 describe the execution of the handoff process.

In step 701, wireless network station 501 transmits an authentication request message to destination AP 562. The authentication request message notifies destination AP 562 to execute FT authentication. The authentication request message at least contains the information of a R0KH ID, but the MDID information is not necessarily included in the authentication request message.

Step 702 is to select the handoff process. Through searching for the ID of the R0KH in the R0KH table of destination AP 562, a suitable handoff process may be determined. After destination AP 562 receives the authentication request message from wireless network station 501, destination AP 562 reads the R0KH ID in the message, and compares with the R0KH table of destination AP to determine whether wireless network station 501 should execute an initial MD association handoff process (step 703), or a Fast BSS handoff process (step 704).

When R0KH ID is not stored in the R0KH table of destination AP 562, destination AP 562 executes the open system authentication and replies the authentication response message to wireless network station 501, as in step 703. In the response message, the setting parameter is set as the open system authentication. After wireless network station 501 receives the response message, wireless network station 501 executes the initial MD association handoff process. The description of the initial MD association handoff process is as in FIG. 2, and is omitted here.

When R0KH ID is already stored in R0KH table of destination AP 562, destination AP 562 executes the FT authentication and replies the authentication response message to wireless network station 501, as in step 704. In the response message, the setting parameter is set as the FT authentication. After wireless network station 501 receives the response message, wireless network station 501 executes the Fast BSS handoff process. The description of the fast BSS handoff process is as in FIG. 3, and is omitted here.

In this manner, without using the MDID for the handoff process, the present invention may avoid the uncertainty of MDID. Also, through searching for the R0KH table stored at the AP, the wireless network station may distinguish whether the movement is an inter-MD movement or an intra-MD movement, and selects a suitable handoff process accordingly.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for executing a handoff process in wireless networks, applicable to a movement of a wireless network station when said wireless network station moves from a source access point (AP) to a destination AP, said apparatus comprising:
 a plurality of R0 key holder (R0KH) tables, each AP in said wireless networks having one of said R0KH tables for storing identities (IDs) of all R0KHs accessible to the AP within coverage of the AP; and
 a processor for executing an identity (ID) checking mechanism, said ID checking mechanism determining a setting parameter of a handoff process in an authentication response message responded to said wireless network station according to whether a R0KH ID contained in an authentication request message requested by said wireless network station is stored in the R0KH table of said destination AP or not;
wherein said wireless network station executes said handoff process according to said setting parameter.

2. The apparatus as claimed in claim 1, wherein said handoff process is either an initial mobility domain (MD) association handoff process or a Fast Basic Service Set handoff process.

3. The apparatus as claimed in claim 1, wherein when said R0KH ID contained in said authentication request message is stored in the R0KH table of said destination AP, said setting parameter of said handoff process is fast transition authentication.

4. The apparatus as claimed in claim 1, wherein when said R0KH ID contained in said authentication request message is not stored in the R0KH table of said destination AP, said setting parameter of said handoff process is open system authentication.

5. The apparatus as claimed in claim 1, wherein said apparatus is applied to IEEE802.11r protocol.

6. The apparatus as claimed in claim 1, wherein said movement of said wireless network station is either an inter mobility domain movement or an intra mobility domain movement.

7. A method for executing a handoff process in wireless networks, applicable to a movement of a wireless network station when said wireless network station moves from a source access point (AP) to a destination AP, said method comprising:
 said wireless network station transmitting an authentication request message to said destination AP, said authentication request message containing a R0 key holder identity (R0KH ID);
 using said R0KH ID to search a R0KH table of said destination AP for determining a handoff process, said R0KH table of said destination AP consisting of IDs of all R0KHs accessible to said destination AP within coverage of said destination AP;
 when said R0KH ID is not stored in said R0KH table, said wireless network station executing an initial mobility domain (MD) association handoff process; and
 when said R0KH ID is stored in said R0KH table, said wireless network station executing a Fast Basic Service Set (BSS) handoff process;
 wherein each AP in said wireless networks has a R0KH table for storing the IDs of all R0KHs accessible to the AP within the coverage of the AP.

8. The method as claimed in claim 7, wherein when said R0KH ID contained is not stored in said R0KH table, said destination AP replies an authentication response message containing a setting parameter of said handoff process, and sets said setting parameter as open system authentication.

9. The method as claimed in claim 8, wherein said wireless network station executes an initial MD association handoff process.

10. The method as claimed in claim 7, wherein when said R0KH ID contained is stored in said R0KH table, said destination AP replies an authentication response message containing a setting parameter of said handoff process, and sets said setting parameter as fast transition (FT) authentication.

11. The method as claimed in claim 10, wherein said wireless network station executes a Fast BSS handoff process.

12. The method as claimed in claim 7, wherein said source AP and said destination AP are both in the same MD.

13. The method as claimed in claim 7, wherein said source AP and said destination AP are in different MDs.

* * * * *